Patented May 13, 1924.

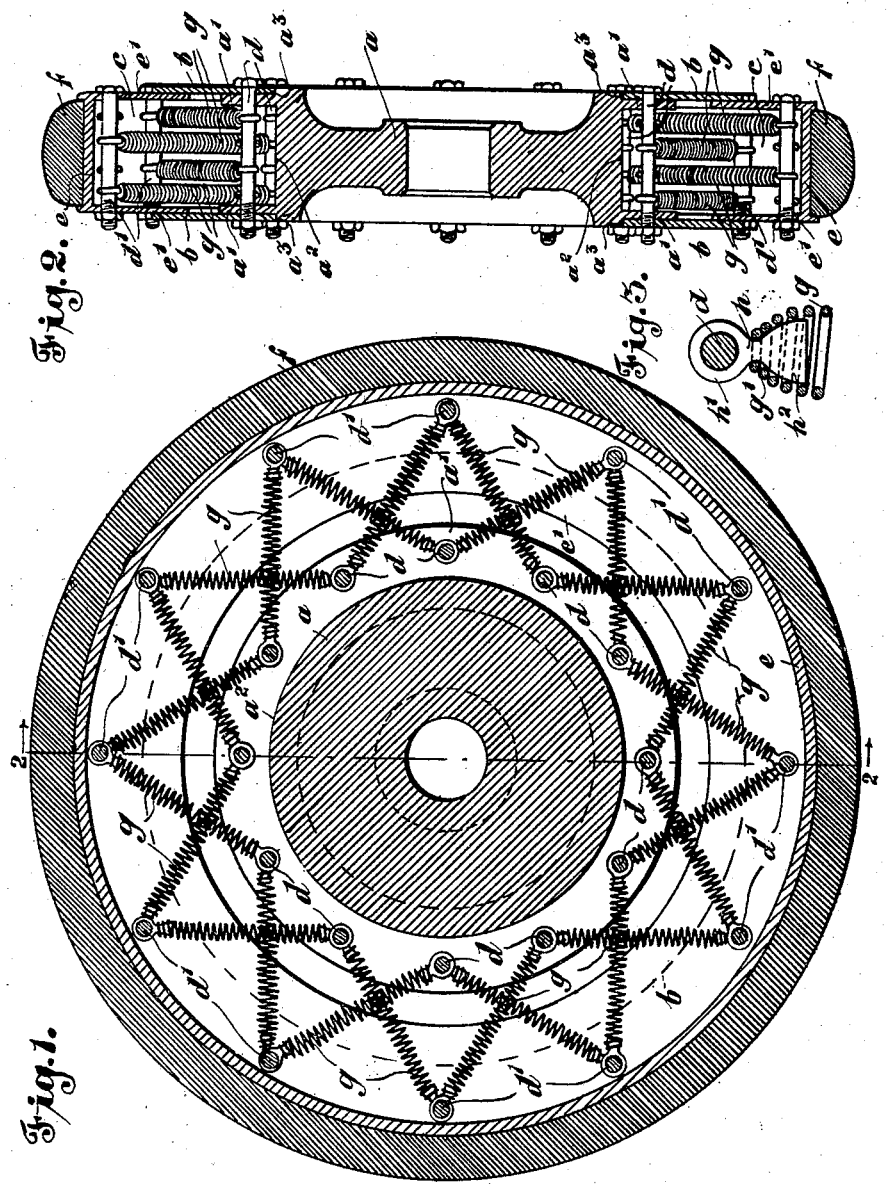

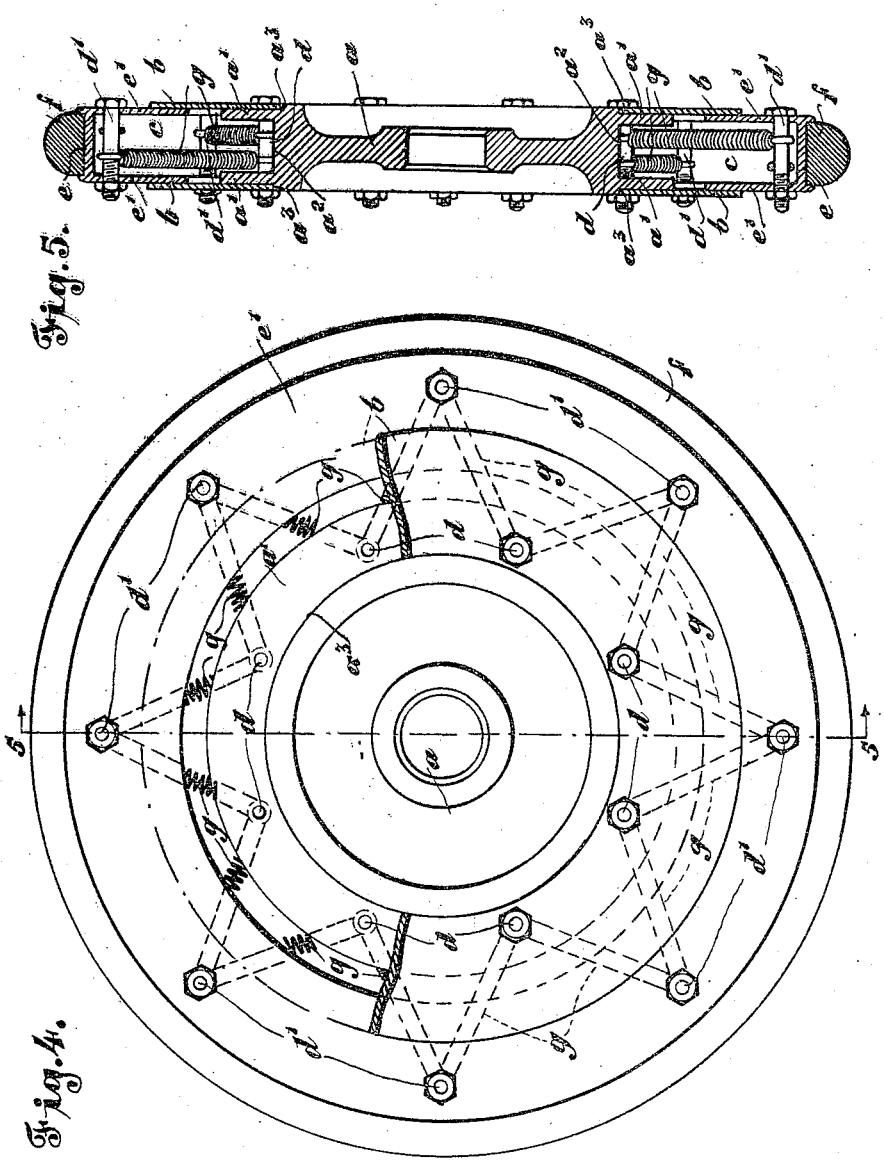

1,493,462

UNITED STATES PATENT OFFICE.

FRANCIS BRATT, OF LADYWOOD, BIRMINGHAM, ENGLAND.

CONSTRUCTION OF SPRING WHEELS.

Application filed April 18, 1922. Serial No. 555,370.

*To all whom it may concern:*

Be it known that I, FRANCIS BRATT, a subject of the Kingdom of Great Britain, engineer, residing at 158 Grosvenor Street, West, Ladywood, Birmingham, in the county of Warwick, England, have invented a certain new and useful Construction of Spring Wheels, of which the following is a specification.

This invention comprises certain improvements in or relating to the construction of spring or shock-absorbing wheels, such as are used for example as the road wheels of cars, lorries, cycles, and other road vehicles, either motor-driven or otherwise, or as the landing wheels of aeroplanes and other aircraft, or for other like purposes.

The object is to provide a spring or shock-absorbing suspension of a particularly simple and effective character between the inner or body part of the wheel and the rim or tyre-carrying part or parts thereof.

According to the present invention the spring or shock-absorbing suspension involves a diametrically telescoping annular connection between the body and rim parts of the wheel, in cooperation with an internal annular series of tension springs connecting said parts and disposed obliquely and symmetrically in the plane of the wheel and advantageously in star formation, or in cooperation with an axially separated plurality of such series of tension springs.

In order that this invention may be clearly understood, and readily carried into practice reference may be had to the appended explanatory sheet of drawings upon which:—

Figure 1 is a sectional side elevation of a spring or shock-absorbing wheel according to the present invention.

Figure 2 is a sectional front elevation of the same, on the line 2—2 of Figure 1.

Figure 3 is a sectional detail view illustrating the attachment of the tension springs.

Figure 4 is a side elevation, with parts broken away, of a spring wheel according to a modified form of the invention.

Figure 5 is a sectional front elevation of the same, on the line 5—5 of Figure 4.

In a convenient embodiment of the invention, Figures 1 to 3, the body part $a$ of the wheel may be constructed of aluminium alloy or other suitable metal in disc formation, or may alternatively be constructed with spokes, the wheel body in either case being formed at its inner and outer faces with flanges $a^1$ projecting in the plane of the wheel in such a manner as to enclose between them a circumferential groove $a^2$ of substantial width and of an approximately U-shape or channel shape in cross section. Each of these flanges $a^1$ is formed with a shallow annular recess $a^3$ extending circumferentially around its exterior face, and within these recesses $a^3$ are fitted a pair of annular plates $b$, flush with the inner and outer faces of the wheel respectively, these plates $b$ forming radial or outward extensions of the flanges $a^1$ to thereby provide an enlargement or chambered extension $c$ of the circumferential groove $a^2$ of the wheel body. The pair of annular plates $b$ are secured firmly in position by means of a spaced annular series of bolts $d$ passing transversely through said plates and through the flanges $a^1$ of the wheel body $a$.

Between the pair of annular plates $b$, and within the chambered extension $c$ of the circumferential groove $a^2$ of the wheel body, is assembled the outer or rim part $e$ of the wheel. This wheel rim $e$ is of a channel or substantially U-shape in cross-section, with its parallel inner and outer annular flanges $e^1$ in diametrically-telescoping relation to the annular extension plates $b$ of the wheel body $a$. The rim $e$ carries any suitable form of tyre or tread $f$ around its base or circumferential part, and is also provided with a spaced annular series of bolts $d^1$ passing through the flanges $e^1$ and extending transversely across the interior chamber of the rim at a point adjacent said circumferential base part, these bolts $d^1$ corresponding in number to the transverse bolts $d$ of the wheel body $a$ and being located in radially corresponding positions.

The bolts $d^1$ of the wheel rim $e$ and the bolts $d$ of the wheel body $a$ are connected, within the interior annular telescoping chamber $c$ of the wheel, by a series of tension springs $g$ in the plane of the wheel. Each of these springs $g$ is of straight spiral formation, and is disposed obliquely in relation to a radial line of the wheel, that is to say in a position intermediate between a radial and a tangential line, the spring being connected at its outer extremity to a bolt $d^1$ of the wheel rim $e$, and being connected at its inner extremity to a bolt $d$ of the wheel body $a$. These obliquely arranged springs $g$ are inclined alternately in opposite directions, so that the annular series of springs comprise a star formation, so as to be equally effective for rotation of the wheel in either direction.

The attachment of each spring $g$ to the bolt $d^1$ and to the bolt $d$ is advantageously provided by means of a small eyeletted nipple $h$, shown in detail in Figure 3, assembled at its eyelet and $h^1$ upon the bolt and having its enlarged knob end $h^2$ encircled and embraced by the reduced terminal coils $g^1$ of the spring, this construction of spring avoiding any tendency of the spring connection to become detached.

Advantageously an axially separated plurality of such series of tension springs $g$ in star formation is provided, the number of such series depending on the size of the wheel and the width of the internal annular chamber $c$ thereof. But the springs of alternate series are arranged in circumferential alternation, that is to say the apical points of the one star formation of springs are connected to alternate bolts $d^1$ of the wheel rim $e$, and the apical points of the next or adjacent star formation of springs are connected to the intermediate alternate bolts $d^1$ of the wheel rim $e$, the spring suspension being thereby provided at a multiplicity of circumferentially spaced points in the wheel. In the drawings (Figures 1 and 2) two such series of tension springs $g$ in star formation are illustrated.

In a modified embodiment of the invention, Figures 4 and 5, as applied to a wheel of lighter and narrower construction, the obliquely arranged springs $g$ are inclined alternately in opposite directions so as to comprise a single star formation, so that the spring suspension is again equally effective for rotation of the wheel in either direction.

In the application of the invention to heavy twin-tyred wheels, each tyre of the pair is mounted on an independent rim, the pair of rims being arranged side by side in cooperation with a common intermediate guide plate and a pair of outer guide plates on the wheel body, each rim with its tyre being connected to the body by an independent series of the tension springs, whereby each tyre of the pair can follow irregularities arising in its respective track, independently of the movement of the other tyre.

What I claim as my invention and desire to secure by Letters Patent is:—

1. A spring wheel comprising a central circular body, a rim, and coiled retractor springs connecting said body and rim, said springs being arranged tangentially with respect to the body and being also arranged in cross relation to one another, said body and rim having annular grooves in their opposing peripheries in which grooves the end portions of said springs are arranged and the said body being also provided on opposite sides with plates between which the sides of the rim are guided, bolts passing through the side flanges and plates of the wheel body and to which the inner ends of said springs are connected and bolts passing through the said flanges of the rim and to which the outer ends of said springs are connected.

2. A wheel comprising a body part having side flanges projecting outwardly in the plane of the wheel so as to enclose a circumferential groove of substantial width and of an approximately U-shaped or channel-shaped cross section, a pair of annular plates fitted within shallow annular circumential recesses in the exterior faces of the respective flanges so as to form radial or outward extensions of the flanges and to thereby provide an enlargement or chambered extension of the circumferential groove of the body, a rim part of substantantially U-shaped or channel shaped cross section having its side flanges in diametrically telescoping relation to the annular extension plates of the body, a tyre or tread carried by said rim, a spaced inner annular series of bolts passing through said plates and wheel body flanges so as to extend transversely across the circumferential groove of the body, a spaced outer annular series of bolts passing through the rim flanges so as to extend transversely across the interior chamber of said rim, and tension springs obliquely connecting successive pairs of bolts of said inner and outer series.

In witness whereof I have hereunto set my hand.

FRANCIS BRATT.